United States Patent [19]
D'Amico et al.

[11] 3,728,355
[45] Apr. 17, 1973

[54] 3-CARBOCYCLIC-5,5-DIALKYL-2-IMIDAZOLIDINETHIONES

[75] Inventors: John Joseph D'Amico, Akron; Darrell Dexter Mullins, Norton, both of Ohio

[73] Assignee: Monsanto Company, St. Louis, Mo.

[22] Filed: Sept. 21, 1970

[21] Appl. No.: 74,145

[52] U.S. Cl. ..........260/309.7, 260/92.3, 260/309.6, 260/563 C, 260/574, 260/577, 260/784
[51] Int. Cl. .....................C07d 49/30, C07d 49/34
[58] Field of Search.................................260/309.7

[56] References Cited

UNITED STATES PATENTS

| | | | |
|---|---|---|---|
| 3,174,975 | 3/1965 | Langis et al. | 260/309.6 |
| 2,596,742 | 5/1952 | Vaughn et al. | 260/309.7 |
| 2,751,370 | 6/1956 | Roussel | 260/309.7 |

FOREIGN PATENTS OR APPLICATIONS

| | | | |
|---|---|---|---|
| 972,003 | 10/1964 | Great Britain | 260/309.7 |
| 995,366 | 10/1965 | Great Britain | 260/309.7 |

OTHER PUBLICATIONS

Allen et al., Plant Physiology, Vol. 26, Pages 611–624 (1951).

*Primary Examiner*—Natalie Trousof
*Attorney*—Richard O. Zerbe, J. E. Maurer and Neal E. Willis

[57] ABSTRACT

3-Carbocyclic-5,5-dialkyl-2-imidazolidinethiones useful as intermediates and accelerators of vulcanization of chloroprene rubbers.

2 Claims, No Drawings

3-CARBOCYCLIC-5,5-DIALKYL-2-IMIDAZOLIDINETHIONES

This invention relates to 3-carbocyclic-5,5-dialkyl-2-imidazolidinethiones and to accelerating the vulcanization of chloroprene rubbers therewith.

A well known accelerator of the vulcanization of chloroprene rubbers is 2-mercaptoimidazoline, also known as ethylene thiourea, but it is deficient in processing safety. The present invention provides accelerators which have improved processing safety.

The compounds of the present invention are 3-carbocyclic-5,5-dialkyl-2-imidazolidinethiones which may be represented by the formula

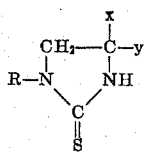

wherein $x$ and $y$ are lower alkyl of one to six carbon atoms and R is a carbocyclic radical either aryl or alicyclic, for example, cyclopentyl, cyclohexyl, cyclooctyl, cyclododecyl, phenyl, monohalogen substituted phenyl, dihalogen substituted phenyl, lower alkoxy substituted phenyl, p-anilino phenyl and lower alkyl phenyl such as tolyl and xylyl. The compounds may also be represented by the tautomeric modification of the foregoing formula as follows:

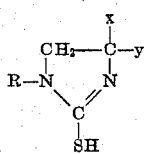

but the experimental evidence from infrared and nuclear magnetic resonance spectral analysis indicates that they are predominately in the thione form.

The new compounds form by heating the diamine

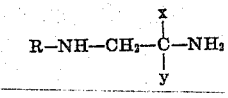

with $CS_2$. The preparation of the compounds is illustrated by the following non-limitative examples.

EXAMPLE 1

5,5-Dimethyl-3-phenyl-2-imidazolidinethione

There was added in one portion 60.8 grams (0.6 mole) of carbon bisulfide to a stirred solution of 49.3 grams (0.3 mole) of N-(2-amino-2-methyl)propylaniline, 150 ml. of ethyl alcohol and two drops of piperidine. The mixture was heated at refluxing temperature (47°–68°C.) for 24 hours, cooled to 0°C., and then stirred at 0°–10°C. for an hour. After filtering, the product was air-dried at 25°–30°C. giving a white solid, melting point 171°–172°C. in 86.5 percent yield. Upon recrystallization from alcohol, the melting point was unchanged. The product analyzed 13.43 percent nitrogen and 15.57% sulfur compared to 13.58 percent nitrogen and 15.54 percent sulfur calculated for $C_{11}H_{14}N_2S$.

EXAMPLE 2

5,5-Dimethyl-3-p-fluorophenyl-2-imidazolidinethione

There was added in one portion 41.8 grams (.55 mole) of carbon bisulfide to a stirred solution of 45.6 grams (0.25 mole) of N-(2-amino-2-methyl)propyl-p-fluoroaniline, 100 milliliters of ethyl alcohol, and three drops of piperidine. The mixture was heated at refluxing temperature for 24 hours, cooled to 0°C., stirred at 0°–10C. to obtain 55 grams product, melting point 180°–182°C. in 98 percent yield. Upon recrystallization from alcohol the melting point was unchanged. The product analyzed 12.27 percent nitrogen and 14.23 percent sulfur as compared to 12.49 percent nitrogen and 14.30 percent sulfur calculated for $C_{11}H_{13}N_2SF$.

EXAMPLE 3

5,5-Dimethyl-3-o-fluorophenyl-2-imidazolidinethione

In the procedure of Example 2, the amine is replaced by N-(2-amino-2-methyl)propyl-o-fluoro aniline. There is obtained 55 grams product, melting point 219°–221°C. in 98 percent yield. The melting point after recrystallizing from chloroform is 223°–224°C. It contains 12.39 percent nitrogen and 14.24 percent sulfur as compared to calculated values of 12.49 percent nitrogen and 14.30 percent sulfur.

EXAMPLE 4

5,5-Dimethyl-3-(4-anilinophenyl)-2-imidazolidinethione 41.8 Grams of carbon bisulfide were added in one portion to a solution of 63.8 grams (0.25 mole) of N-(2-amino-2-methyl)propyl-p-anilino aniline, 100 ml. of ethyl alcohol, and three drops of piperidine. The procedure was the same as in Example 2. There was obtained 72 grams of product, melting point 250°–251°C. After recrystallization from acetone, the melting point was unchanged. The yield was 96 percent. The product contained 14.16 percent nitrogen and 10.72 percent sulfur as compared to calculated values of 14.13 percent nitrogen and 10.78 percent sulfur.

EXAMPLE 5

5,5-Dimethyl-3-o-tolyl-2-imidazolidinethione

There was added in one portion 41.8 grams (0.55 mole) of carbon bisulfide to a mixture of 44.6 grams (0.25 mole) of N-(2-amino-2-methyl)propyl-o-toluidine, 100 ml. of ethyl alcohol, and three drops of piperidine. The charge was heated at refluxing temperature for 24 hours, cooled to 0°C., filtered, washed with 100 ml. of heptane, and air dried at 25°–30°C. There was obtained 52 grams, melting point 233°-4°. The melting point was 234°-5° after recrystallization from chloroform. The yield was 94.5 percent. The product contained 12.32 percent nitrogen and 14.16 percent sulfur as compared to calculated values of 12.72 percent nitrogen and 14.55 percent sulfur.

EXAMPLE 6

5,5-Dimethyl-3-metatolyl-2-imidazolidinethione

In the procedure of Example 5, there was substituted for the amine reactant a like quantity of N-(2-amino-2-methyl)propyl-m-toluidine. There was obtained 50 grams of product, melting point 168.0°-168.5°C. The melting point after recrystallizing from alcohol was 168.0°-168.5°C. The yield was 90.5 percent. The product contained 12.56 percent nitrogen and 14.08 percent sulfur as compared to 12.72 percent nitrogen and 14.55 percent sulfur.

EXAMPLE 7

5,5-Dimethyl-3-p-tolyl-2-imidazolidinethione

In the procedure of Example 6 there was substituted for the amine a like quantity of N-(2-amino-2-methyl)propyl-p-toluidine. There was obtained 53 grams, melting point 195°-196°C. The melting point remained unchanged after recrystallizing from alcohol. The product obtained in 96.5 percent yield, contained 12.57 percent nitrogen and 14.32 percent sulfur as compared to calculated values at 12.72 percent nitrogen and 14.55 percent sulfur.

EXAMPLE 8

5,5-Dimethyl-3-p-chlorophenyl-2-imidazolidinethione 41.8 Grams (0.55 mole) of carbon bisulfide was added in one portion to a solution of 49.7 grams (0.25 mole) of N-(2-amino-2-methyl)-propyl-p-chloroaniline, 100 ml. of ethyl alcohol, and three drops of piperidine. The heat of reaction caused temperature to rise from 28° to 33°C. The mixture was stirred and heated at refluxing temperature for 24 hours, cooled at 0°C., stirred at 0°-10° for 30 minutes and the solids removed by filtration and dried at 25°-30°C. There was obtained 45 grams, melting point 167°-9°C. The melting point after recrystallizing from alcohol was 169°-170°C. Product obtained in 74.5 percent yield, contained 12.19 percent nitrogen and 13.46 percent sulfur as compared to calculated values of 11.64 percent nitrogen and 13.3 percent sulfur.

EXAMPLE 9

5,5-Dimethyl-3-(3,4-dichlorophenyl)-2-imidazolidinethione

There was added in one portion 33.3 grams (0.44 mole) of carbon bisulfide to a solution of 46.7 grams (0.2 mole) of N-(2-amino-2-methyl)propyl-3,4-dichloroaniline, 100 ml. of ethyl alcohol, and three drops of piperidine. The heat of reaction caused the temperature to rise from 24° to 28°C. The reaction mixture was stirred and heated at refluxing temperature for 24 hours, cooled to 0°C., stirred at 0°-10°C. for 30 minutes, the solids filtered and dried in air 25°-30°C. There was obtained 48 grams, melting point 190°-195°C. in 87 percent yield. After recrystallizing from alcohol, the melting point was 220°-221°C. The product contained 10.11 percent nitrogen and 11.85 percent sulfur as compared to calculated values of 10.18 percent nitrogen and 11.65 percent sulfur.

EXAMPLE 10

5,5-Dimethyl-3-(p-ethoxyphenyl)-2-imidazolidinethione

There was added in one portion 41.8 grams (0.55 mole) of carbon bisulfide to a solution of 52.1 grams (0.25 mole) of N-(2-amino-2-methyl)propyl-p-ethoxy aniline, 100 ml. of ethyl alcohol, and three drops of piperidine. The temperature rose from 30°-39°C. due to the heat of reaction. The reaction mixture was heated at refluxing temperature (53°-57°C) for 24 hours, cooled to 0°C., stirred at 0°-10°C. for 30 minutes, and the solids collected by filtration and air dried at 25°-30°C. There was obtained 60 grams, melting point 195°-196°C. After recrystallizing from ethyl alcohol, the product melted at 201°-202°C. The yield was 95.5 percent of product analyzing 10.94 percent nitrogen and 12.71 percent sulfur as compared to 11.19 percent nitrogen and 12.81 percent sulfur calculated for $C_{13}H_{18}N_2OS$.

EXAMPLE 11

5,5-Dimethyl-3-cyclohexyl-2-imidazolidinethione

The amine required for this example was prepared by the method of M. Senkus, J. Am. Chem. Soc. 68, 10-12, (1946). Replacing the nitro amine by N-(2-amino-2-nitropropyl)cyclo-hexylamine, there was obtained in 46.7 percent yield, N-(2-amino-2-methylpropyl)cyclohexylamine, b.p. 114°-116°C./15 mm. To a solution of 34 grams (0.2 mole) of this amine, 100 ml. of ethyl alcohol and three drops of piperidine there was added dropwise, 16.8 grams (0.22 mole) of carbon bisulfide. The heat of reaction caused the temperature to rise from 25° to 34°C. The procedure was the same as Example 10. 5,5-Dimethyl-3-cyclohexyl-2-imidazolidinethione was obtained in 70.6 percent yield, melting point 242°-244°C. The melting point after recrystallization from DMF was 246°-247°C. Analysis gave 13.20 percent nitrogen and 14.87 percent sulfur as compared to 13.19 percent nitrogen and 15.10% sulfur calculated for $C_{11}H_{20}N_2S$.

In another procedure 16.8 grams (0.22 mole) of carbon bisulfide was added dropwise to a solution of 34 grams (0.2 mole) of N-(2-amino-2-methylpropyl)cyclohexylamine containing 2 ml. of sodium hypochlorite. Using the same procedure as above, the yield was 94.4 percent of said product melting at 246°-247°C. Upon recrystallization from 300 ml. dimethylformamide/100 ml. water the melting point remained unchanged. The analysis gave 13.07 percent nitrogen and 14.59 percent sulfur.

The chloroprene rubbers known commercially as neoprene are polymers of 2-chloro-1,3-butadiene (chloroprene) and copolymers of chlorprene with dienes or vinyl compounds in which chloroprene comprises the predominant monomer. They are vulcanizable with certain metal oxides, examples of which are magnesium oxide, lead oxide and zinc oxide. The temperature of vulcanization is within the range of 120°-200°C. and usually 140°-160°C. The new accelerators may be utilized in stocks containing any of the usual chloroprene rubber vulcanizing agents and with carbon black or light fillers. The accelerator may be as little as 0.05 parts by weight per 100 parts by weight or chloroprene rubber or as much as 10 parts by weight but will usually be 0.1–5 parts by weight and preferably 0.5–2 parts by weight.

The data in the tables below illustrate useful properties for accelerating vulcanization of chloroprene rubber. For all the rubber stocks tested and described, Mooney scorch times at 121°C. are determined by means of a Mooney plastometer. The time in minutes ($t_5$) required for the Mooney reading to rise five points above the minimum viscosity is recorded. Longer times are indicative of greater processing safety. The stocks are cured for the length of time required to obtain the optimum cure. The cure temperature is 153°C. Curing characteristics are determined by means of the Monsanto Oscillating Disc Rheometer described by Decker, Wise and Guerry in Rubber World, Dec. 1962, page 68. From the Rheometer data the time to optimum cure is determined and the stocks are cured in a press for that time. The ultimate tensile strength and modulus at 300 percent elongation are determined for each vulcanizate.

A typical neoprene rubber stock was compounded comprising:

|  | Parts by Weight |
|---|---|
| Neoprene W | 100.0 |
| Magnesium oxide | 4.0 |
| Phenyl alpha naphthylamine | 2.0 |
| Stearic acid | 0.5 |
| SRF carbon black | 75.0 |
| Hydrocarbon softener | 15.0 |
| Zinc Oxide | 5.0 |

To each of the several portions of the base stock was added 0.5 part by weight of accelerator as indicated below. Comparison to stock F and G shows the effect of the carbocyclic and alkyl substituents.

| Stock | Accelerator |
|---|---|
| A | 5,5-Dimethyl-3-phenyl-2-imidazolidinethione |
| B | 5,5-Dimethyl-3-(p-ethoxyphenyl)-2-imidazolidinethione |
| C | 5,5-Dimethyl-3-p-chlorophenyl-2-imidazolidinethione |
| D | 5,5-Dimethyl-3-(3,4-dichlorophenyl-2-imidazolidinethione |
| E | 5,5-Dimethyl-3-cyclohexyl-2-imidazolidinethione |
| F | 3-Phenyl-2-imidazolidinethione |
| G | 5,5-Dimethyl-2-imidazolidinethione |

The physical properties of the respective stocks at optimum cure are given in the following table.

TABLE I

| Stock | Cure Time in Minutes | Modulus at 300% Elong. | Tensil at Break in lbs/in$^2$ | Break Elong. % | Mooney Scorch $t_5$ |
|---|---|---|---|---|---|
| A | 50 | — | 2700 | 280 | 25.8 |
| B | 55 | 2750 | 2800 | 300 | 27.0 |
| C | 40 | 2620 | 2700 | 300 | 28.0 |
| D | 45 | 2470 | 2600 | 310 | 38.0 |
| E | 80 | — | 2200 | 270 | 28.7 |
| F | 40 | 2840 | 2600 | 300 | 15.7 |
| G | 50 | — | 2700 | 240 | 11.5 |

A series of vulcanizates were prepared using the following base stock:

|  | Parts by Weight |
|---|---|
| Neoprene W | 100.0 |
| SRF carbon black | 75.0 |
| Hydrocarbon softener | 15.0 |
| Stearic acid | 0.5 |
| Phenyl alpha naphthylamine | 2.0 |
| Magnesium oxide | 4.0 |

To the above base stock was added in separate stocks 0.5 part by weight of accelerator as indicated below:

| Stock | Accelerator |
|---|---|
| H | 5,5-Dimethyl-3-phenyl-2-imidazolidinethione |
| J | 5,5-Dimethyl-3-p-fluorophenyl-2-imidazolidinethione |
| K | 5,5-Dimethyl-3-o-fluorophenyl-2-imidazolidinethione |
| L | 5,5-Dimethyl-3-(4-anilinophenyl)-2-imidazolidinethione |
| M | 5,5-Dimethyl-3-o-tolyl-2-imidazolidinethione |
| N | 5,5-Dimethyl-3-m-tolyl-2-imidazolidinethione |
| P | 5,5-Dimethyl-3-p-tolyl-2-imidazolidinethione |

The tensile properties of the vulcanizates at the 60 minute cures and resistance of the unvulcanized compositions to scorch are set forth in Table II.

TABLE II

| Stock | Tensile at Break in lbs/in$^2$ | Ult. Elong. % | Mooney Scorch $t_5$ |
|---|---|---|---|
| H | 2700 | 270 | 8.0 |
| J | 2700 | 280 | 9.3 |
| K | 2400 | 280 | 10.5 |
| L | 2400 | 280 | 13.2 |
| M | 2000 | 290 | 12.3 |
| N | 2700 | 270 | 8.3 |
| P | 2400 | 280 | 9.2 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. 3-Carbocyclic-5,5-di(lower alkyl)-2-imidazolidinethione of the formula

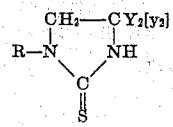

where R is cycloalkyl of five to 12 carbon atoms [or aryl selected from the group consisting of phenyl, monohalophenyl, dihalophenyl, mono(lower alkyl)phenyl, di(lower alkyl)phenyl, lower alkoxyphenyl and anilinophenyl] and Y [y] is lower alkyl.

2. A compound of claim 1 wherein Y [y] is methyl and R is cyclohexyl.

* * * * *

UNITED STATES PATENT OFFICE
CERTIFICATE OF CORRECTION

Patent No. 3,728,355     Dated April 17, 1973

Inventor(s) John Joseph D'Amico and Darrell Dexter Mullins

It is certified that error appears in the above-identified patent and that said Letters Patent are hereby corrected as shown below:

Column 4, line 48, "chlororprene" should read --chloroprene--.

Column 4, line 58, "or" should read --of--.

Column 6, lines 38-52, Claims 1 and 2, the material appearing in brackets should be deleted so that the claims read:

1. 3-Carbocyclic-5,5-di(lower alkyl)-2-imidazolidinethione of the formula

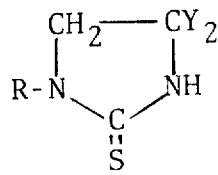

where R is cycloalkyl of 5 to 12 carbon atoms and Y is lower alkyl.

2. A compound of claim 1 where Y is methyl and R is cyclohexyl.

Signed and sealed this 31st day of December 1974.

(SEAL)
Attest:

McCOY M. GIBSON JR.
Attesting Officer

C. MARSHALL DANN
Commissioner of Patents